US012773785B1

(12) United States Patent
Cai et al.

(10) Patent No.: US 12,773,785 B1
(45) Date of Patent: Oct. 27, 2026

(54) ROBOT KINEMATICS CALIBRATION USING COMPLIANCE CONTROL

(71) Applicant: Amazon Technologies, Inc., Seattle, WA (US)

(72) Inventors: Xinyi Cai, Stoneham, MA (US); Mahyar Abdeetedal, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 19/057,479

(22) Filed: Feb. 19, 2025

(51) Int. Cl.
*B25J 9/16* (2006.01)
*B25J 13/08* (2006.01)

(52) U.S. Cl.
CPC .......... *B25J 9/1692* (2013.01); *B25J 13/085* (2013.01); *B25J 13/088* (2013.01)

(58) Field of Classification Search
CPC ....... B25J 9/1692; B25J 13/085; B25J 13/088
See application file for complete search history.

(56) References Cited

U.S. PATENT DOCUMENTS

| | | | | |
|---|---|---|---|---|
| 6,035,228 | A * | 3/2000 | Yanof | A61B 90/11 606/130 |
| 6,668,466 | B1 * | 12/2003 | Bieg | G01B 5/008 33/503 |
| 2020/0398433 | A1 * | 12/2020 | Kelly | B25J 13/085 |
| 2022/0258353 | A1 * | 8/2022 | Tsukamoto | B25J 9/161 |
| 2025/0134606 | A1 * | 5/2025 | Rouillard | A61B 34/20 |
| 2026/0090848 | A1 * | 4/2026 | Talasaz | A61B 34/10 |

OTHER PUBLICATIONS

Kovac et al., Testing and calibration of coordinate measuring arms, 2001, Precision Engineering Journal of the International Societies for Precision Engineering and Nanotechnology 25 (2001) pp. 90-99 (Year: 2001).*

Gaudreault et al., Local and Closed-Loop Calibration of an Industrial Serial Robot using a New Low-Cost 3D Measuring Device, May 16-21, 2016, 2016 IEEE International Conference on Robotics and Automation (ICRA), pp. 4312-4319 (Year: 2016).*

Mark W. Spong et al., *Robot Modeling and Control*, Chapter 3: Forward Kinematics: The Denavit-Hartenberg Convention (32 pages), Wiley, 2020.

* cited by examiner

*Primary Examiner* — Sze-Hon Kong
(74) *Attorney, Agent, or Firm* — Kilpatrick Townsend & Stockton LLP

(57) ABSTRACT

Techniques described herein involve robotic kinematics calibration using compliance control. For example, a computer-implemented method can involve controlling, based at least in part on estimated kinematic parameters of a robotic manipulator that includes a joint, the robotic manipulator along a trajectory toward a guide with a known location with respect to the robotic manipulator. The method can involve adjusting movement of the robotic manipulator along the trajectory based at least in part on sensor data associated with the joint. The method can involve determining that a component of the robotic manipulator is positioned at the known location of the guide. The joint can have a joint angle when the component is positioned at the known location. The method can involve determining actual kinematic parameters of the robotic manipulator based at least in part on the known location and on the joint angle.

20 Claims, 10 Drawing Sheets

ROBOT KINEMATICS CALIBRATION USING COMPLIANCE CONTROL

BACKGROUND

Many modern day industries are relying more and more on robotic manipulators. Such robotic manipulators may function to increase repeatability of tasks, increase efficiency of production lines, and bring other benefits to their operators. For instance, robotic manipulators may be used in modern inventory systems, such as those in mail order warehouses, supply chain distribution centers, airport luggage systems, or custom-order manufacturing facilities.

BRIEF DESCRIPTION OF THE DRAWINGS

Various embodiments in accordance with the present disclosure will be described with reference to the drawings, in which.

DETAILED DESCRIPTION

Figure 1:
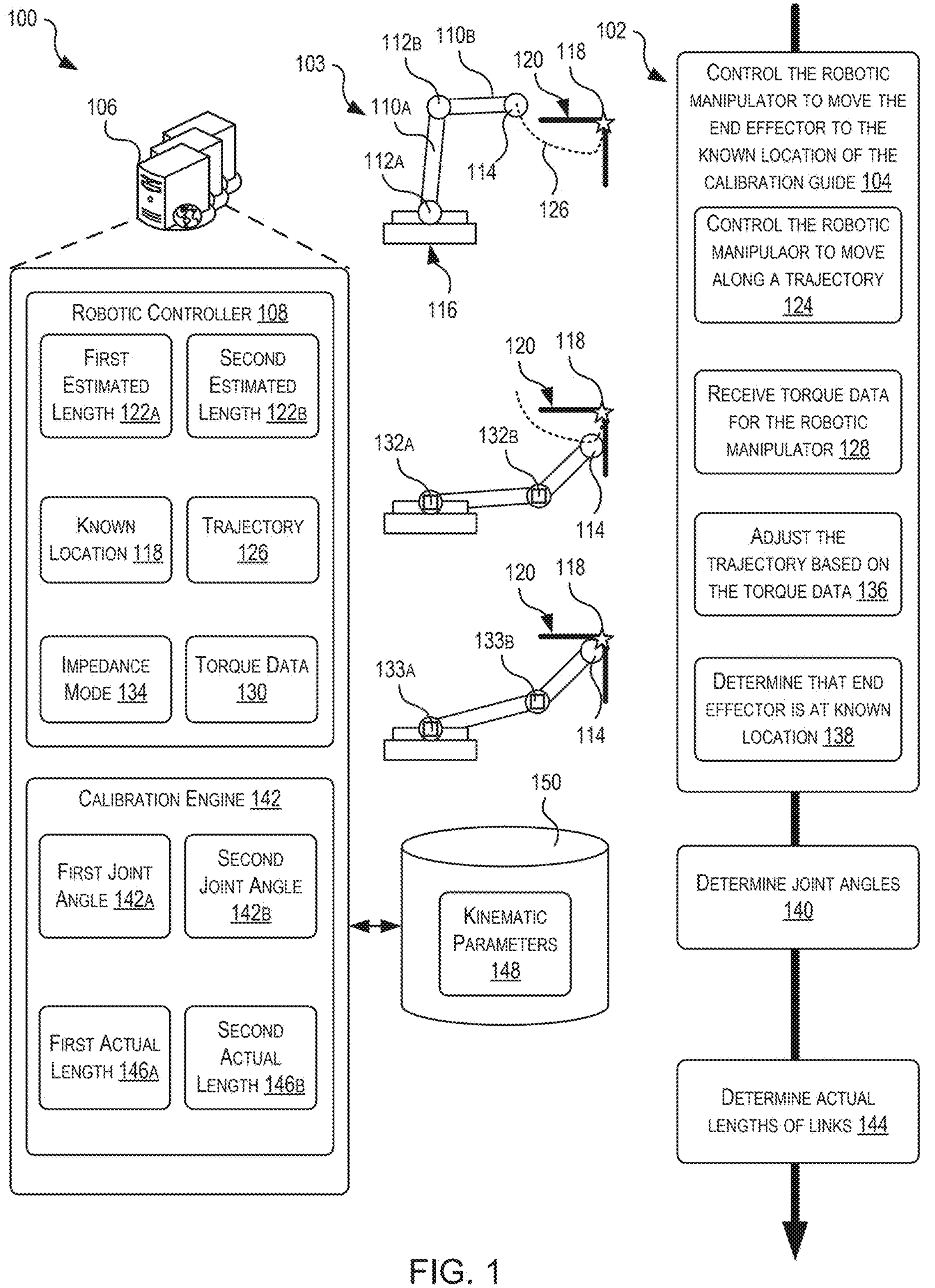
FIG. 1 illustrates a block diagram of a system and a flowchart showing an example process for robot kinematics calibration using compliance control, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, performing robot kinematics calibration using compliance control. Compliance control can involve modifying movement of a robotic manipulator based on external forces. For example, compliance control can include controlling a robotic manipulator in a low-impedance mode that involves reducing applied force and adjusting trajectory of the robotic manipulator when the robotic manipulator contacts a surface. When contact occurs, instead of rigidly maintaining the pre-planned trajectory, the robotic manipulator can "comply" with the contacted surface and move along the contacted surface with reduced force to reduce the risk of damage to itself or surroundings. Such compliance control can be utilized to determine highly precise actual kinematic parameters of components of the robotic manipulator. For instance, due to the tolerance stack up from manufacturing and assembly, every robotic manipulator is slightly different from its nominal designed size. It may be important to know the actual length of links in the robotic manipulator to allow for accurate control of the robotic manipulator. Thus, to calibrate the robotic manipulator, the robotic manipulator can be moved to a known location of a calibration guide via compliance control. The resulting joint angles at the known location can be used to determine actual kinematic parameters, such as the actual link lengths, of the robotic manipulator.

In a particular example, a robotic manipulator may have links (e.g., rods or bars) that are connected via joints. The joints can be actuated to provide a certain rotational range of motion to the links. The robotic manipulator may also include an end effector (e.g., an end-of-arm tool) attached to the end of a link or joint of the robotic manipulator. The end effector may, for example, perform tasks such as grasping, moving, or otherwise interacting with environmental objects. The links can be manufactured to have a nominal length (also referred to herein as an estimated length). But the nominal length will likely differ from the actual length, and thus the calibration techniques described herein may be performed to determine the actual length. Further, the robotic manipulator may, for example, have a modular construction that can allow links, joints, and/or end effectors to be quickly and easily removed or replaced. Each modification to the robotic manipulator may necessitate another calibration for the new configuration.

Calibration can be performed using a calibration guide, which may be an object having a known location with respect to the robotic manipulator. For example, the calibration guide may have a structure that can constrain the end effector in at least two dimensions, such as by having a corner shape. The known location may be location coordinates of the corner of the calibration guide with respect to a base of the robotic manipulator. The estimated lengths of the links can be used to generate an estimated trajectory for moving the end effector of the robotic manipulator to the corner. Such an estimated trajectory may be likely to be good enough to control the end effector to get relatively close to the known location of the calibration guide.

As the links are actuated to move the links and end effector into different poses along the estimated trajectory, the robotic manipulator can be operating in a low-impedance mode as part of compliance control. Low-impedance mode can involve torque sensors in the joints detecting torque data indicating forces applied to the robotic manipulator. As the robotic manipulator moves along the estimated trajectory, the torque data may indicate contact between the end effector and a surface of the calibration guide. The robotic manipulator may then use compliance control based on the torque data to adjust the trajectory and move the robotic manipulator along the surface of the calibration guide towards the corner. Because the corner of the calibration guide constrains the end effector in at least two dimensions, when the end effector is located at the corner, compliance control may prevent further movement of the end effector. Thus, the end effector may be located at the known location. Upon determining that the end effector is at the known location in a certain pose, joint encoder readings can be detected that can indicate the joint angles of the joints in the certain pose. Actual lengths of the link can then be determined from the detected joint angles and known location, such as by using a system of functions. Values of the actual lengths may be stored or otherwise used to calibrate the robotic manipulator. Subsequent operation of the robotic manipulator can be improved by using the actual lengths of the links.

Embodiments of the present disclosure may provide technological advantages over conventional techniques for calibrating robotic manipulators. For instance, conventional techniques for robotic calibration involve using laser tracker calibration systems. Such laser tracker calibration systems may be highly expensive, relatively immobile, time-consuming to implement, and difficult to scale. For instance, a laser tracker calibration system may involve the use of highly sensitive three-dimensional sensors that may take up to half an hour to reach thermal stability. Such conventional systems may be particularly infeasible for large-scale robotic operations or for modular robotic manipulators, which may be frequently re-calibrated each time a modular component is replaced or modified. In contrast, embodiments of the present disclosure may use force sensing and compliance control to determine highly accurate kinematic parameters without involving relatively expensive or time-consuming equipment. Kinematic parameters can be determined quickly and accurately for robotic manipulators with any degrees of freedom. Further, embodiments of the present disclosure can allow for large-scale calibration of robotic manipulators using joint torque sensors and calibration guides. In some examples, the calibration guide can be the robotic base of the robotic manipulator.

Turning now to the figures, FIG. 1 illustrates a block diagram of a system 100 and a flowchart showing an example process 102 for robot kinematics calibration using compliance control, according to some embodiments. The system 100 can include devices, objects, and the like that correspond to the process 102. For example, the system 100 can include a robotic manipulator 103, a computing system 106, and a calibration guide 120. The process 102 can be performed by the computing system 106 and/or the computing system 1002 of FIG. 10.

Figure 8:
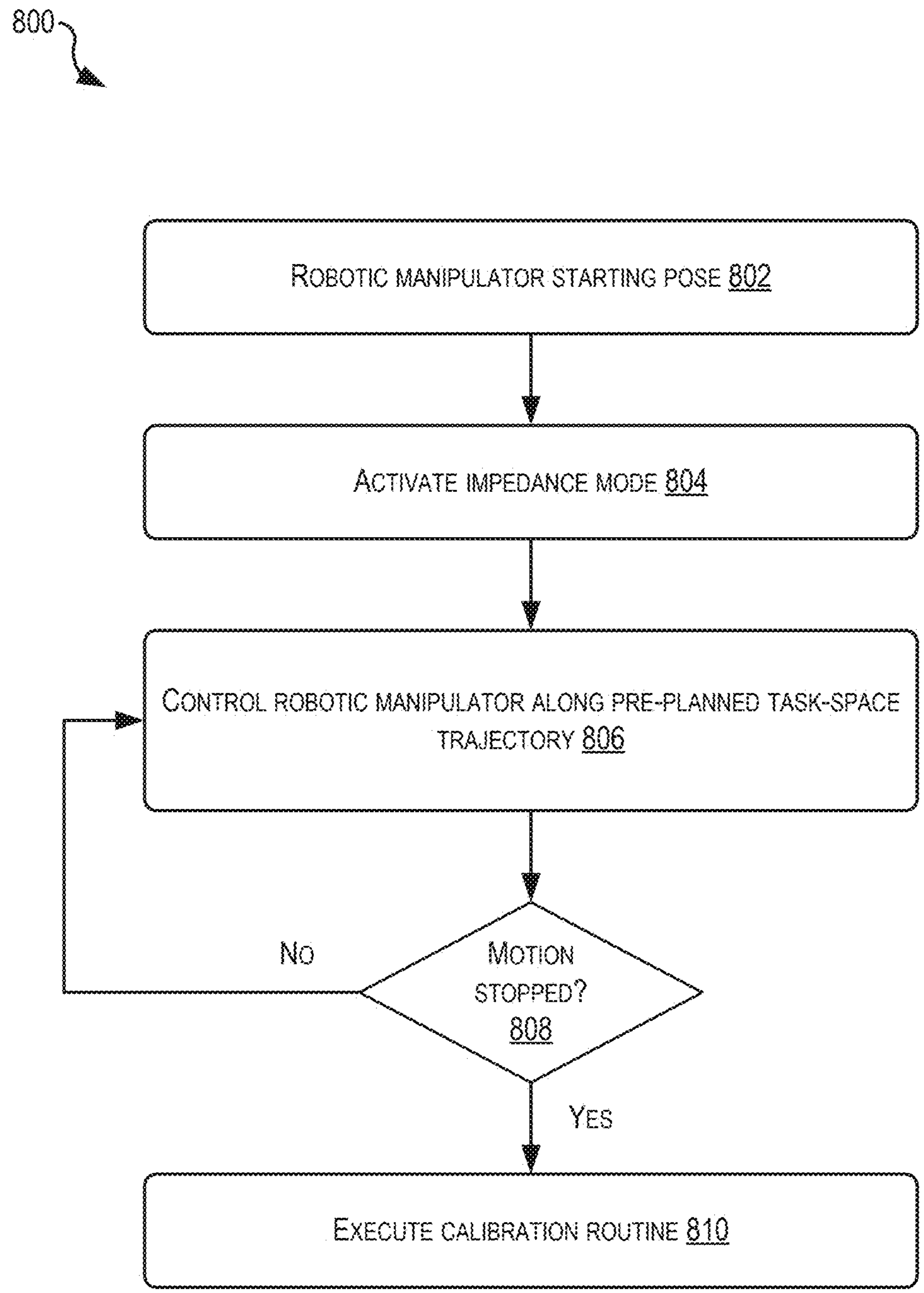
FIG. 8 illustrates a flowchart showing an example process for performing robot kinematics calibration using compliance control, according to some embodiments.
Figure 9:
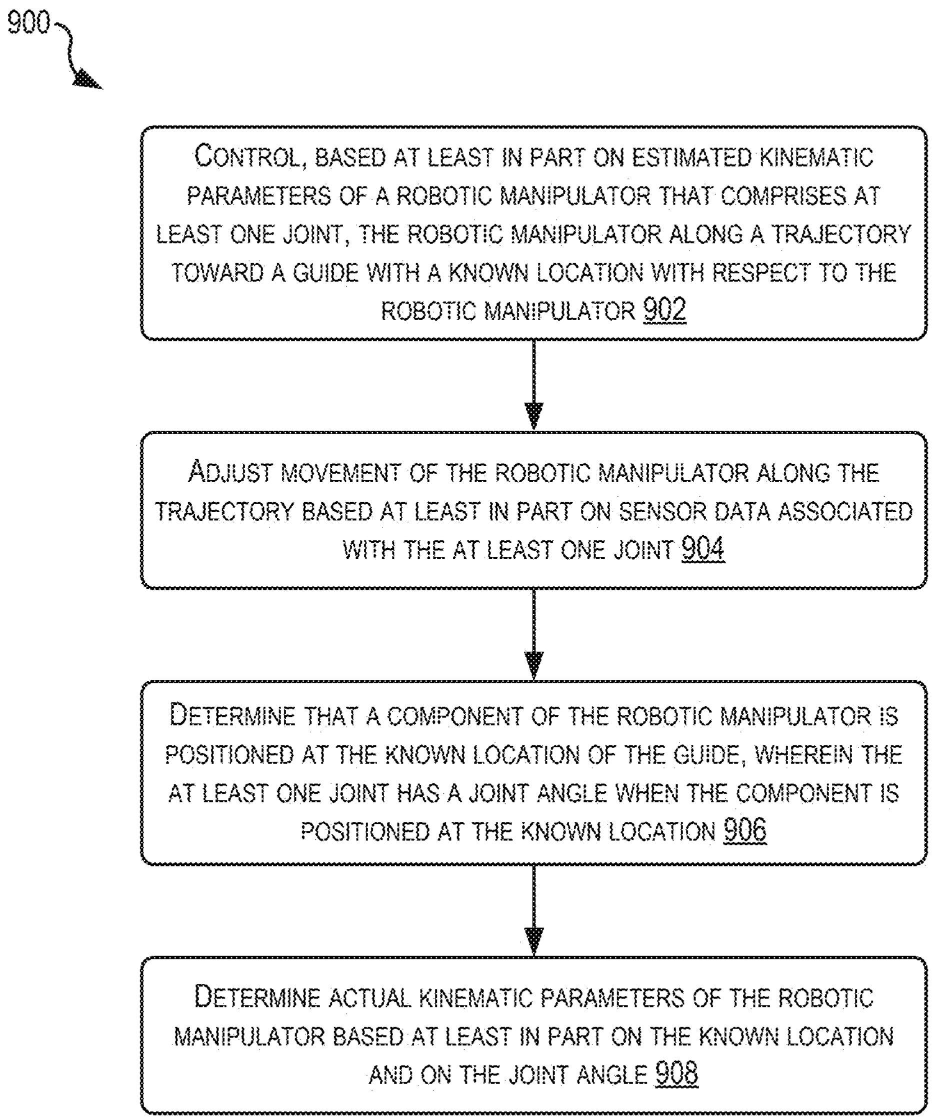
FIG. 9 illustrates a flowchart showing another example process for performing robot kinematics calibration using compliance control, according to some embodiments.

FIGS. 1 and 8-9 illustrate example flow diagrams showing respective processes 102, 800, and 900 as described herein. The processes 102, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 102, 800, or 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 can start at block 104, in which the computing system 106 can control (e.g., by executing a robotic controller 108) the robotic manipulator 103 to move an end effector 114 to a known location 117 of a calibration guide 120. The robotic manipulator 103 may include a first link 110*a* that is rotatably coupled to a robotic base 116 via a first joint 112*a*. The first joint 112*a* may be actuated to rotate the first link 110*a*. The robotic manipulator 103 can also include a second link 110*b* that is rotatably coupled to the first link 110*a* via a second joint 112*b* (e.g., at a first end of the second link 110*b*). The robotic manipulator 103 can include the end effector 114 (e.g., an end-of-arm tool) that can be coupled to a second end of the second link 110*b*. The end effector 114 can be a tool that can perform tasks such as grasping, suctioning, pinching, moving, pushing, or otherwise interacting with environmental objects. The calibration guide 120 may be an object that can constrain the end effector 114 in at least two dimensions. For example, the calibration guide 120 may have an interior corner that is the known location 118. That is, the coordinates (e.g., distance and orientation) of the interior corner with respect to the robotic base 116 may be known (e.g., by the robotic controller 108). In some examples, the calibration guide 120 may be capable of constraining the end effector 114 in more than two dimensions.

The first link 110*a* and the second link 110*b* may have been manufactured to have a first estimated length 122*a* and a second estimated length 122*b*, respectively. But, in some examples, the estimated lengths 122*a-b* may differ from the actual length of the links 110*a-b*. Thus, controlling the robotic manipulator 103 to move the end effector 114 to the known location 118 of the calibration guide 120 can be used to determine the actual lengths. The robotic controller 108 can perform the steps of blocks 124, 128, 136, and 138 to move the end effector 114 to the known location 118.

At block 124, the computing system 106 can execute the robotic controller 108 to control the robotic manipulator 103 to move along a trajectory 126 towards the known location 118. The trajectory 126 can be determined based on the first estimated length 122*a* of the first link 110*a* and the second estimated length 122*b* of the second link 110*b*. Using the estimated lengths 122*a-b* may be likely to result in a trajectory 126 that can control the robotic manipulator 103 to be positioned relatively close to the known location 118. The trajectory 126 can include a path for the end effector 114 to traverse between an initial position and the known location 118, pose orientations for the links 110*a-b* and joints 112*a-b* while traversing the path, velocity and/or acceleration of the links 110*a-b* and/or joints 112*a-b* while executing the trajectory 126, or any other parameters for guiding movement of the robotic manipulator 103 towards the known location 118.

At block 128, the computing system 106 can execute the robotic controller 108 to receive torque data 130 for the robotic manipulator 103 while the robotic manipulator 103 is moving along the trajectory 126. For example, the first joint 112*a* can include or be coupled to a first torque sensor 132*a* that can detect torque measurements (e.g., the torque data 130) for the robotic manipulator 103. Similarly, the second joint 112*b* can include or be coupled to a second torque sensor 132*b* that can detect torque measurements for the robotic manipulator 103. The torque sensors 132*a-b* can transmit the torque data 130 to the computing system 106. Additionally or alternatively, the joints 112*a-b* can include or be coupled to force sensors that can provide force measurements for the robotic manipulator 103.

At block 136, the computing system 106 can execute the robotic controller 108 to adjust the trajectory 126 based at least in part on the torque data 130 (and/or the force data). For example, the robotic controller 108 may be operating in an impedance mode 134 (e.g., a low-impedance mode) in which movement of the robotic manipulator 103 is modified based on detected contact with environmental objects. A low-impedance mode can involve reducing a force and/or speed as well as changing direction of the end effector 114 to prevent damage to the robotic manipulator 103 and/or environmental objects.

The torque data 130 may indicate, for example, that as part of executing the trajectory 126, the end effector 114 has contacted a surface of the calibration guide 120. In some examples, the contacted surface may not be the known location 118 of the calibration guide 120 (e.g., the interior corner). However, by operating the robotic manipulator 103 in the low-impedance mode 134, the trajectory 126 can be adjusted to move the end effector 114 along the surface of the calibration guide 120 until the end effector 114 is positioned at the known location 118. The calibration guide 120 can thus "guide" the end effector towards the interior corner. The low-impedance mode 134 may cause the robotic manipulator 103 to have a maximum force (e.g., as indicated by the torque data 130) applied to the calibration guide 120. Thus, if the original trajectory 126 involved moving the end effector 114 through the calibration guide 120, the low-impedance mode 134 may prevent the end effector 114 from doing so by reducing applied force of the end effector 114 and adjusting the trajectory 126 to follow the surface of the calibration guide 120.

At block 138, the computing system 106 can execute the robotic controller 108 to determine that the end effector 114 is positioned at the known location 118 of the calibration guide 120. For example, because the calibration guide 120 is constrained in at least two dimensions, once the end effector 114 is positioned in the interior corner, the low-impedance mode may prevent further movement of the end effector 114.

At block 140, the computing system 106 can execute a calibration engine 142 to determine a first joint angle 142*a* of the first joint 112*a* and a second joint angle 142*b* of the second joint 112*b* in response to determining that the end effector 114 is positioned at the known location 118. The first joint angle 142*a* and the second joint angle 142*b* can be determined based on sensor data received from a first joint sensor 133*a* within or coupled to the first joint 112*a* and a second joint sensor 133*b* within or coupled to the second joint 112*b*. The joint angles 142*a-b* can be the current angular position of the joints 112*a-b*. The sensor data may be, for example, joint encoder readings from the joint sensors 133*a-b* that can be translated from a digital sensor reading into the joint angles 142*a-b*.

At block 144, the computing system 106 can execute the calibration engine 142 to determine a first actual length 146*a* of the first link 110*a* and a second actual length 146*b* of the second link 110*b* based at least in part on the known location 118, the first joint angle 142*a*, and the second joint angle 142*b*. For example, the calibration engine 142 can set up a system of functions using the known location 118 and the joint angles 142*a-b* to solve for the actual lengths 146*a-b*. Such techniques are further described below with respect to FIG. 4.

The calibration engine 142 can then use the actual lengths 146*a-b* to calibrate the robotic manipulator 103, such as by updating a data store 150 of kinematic parameters 148 of the robotic manipulator 103 used by the robotic controller 108. The robotic controller 108 can then control operation of the robotic manipulator 103 by generating trajectories using the actual lengths 146*a-b* instead of the estimated lengths 122*a-b*. Such trajectories may be more accurate, resulting in increased task success and reduced damage to the robotic manipulator 103 or the environment.

Although the kinematic parameters 148 that are described and depicted in FIG. 1 as being calibrated are actual lengths 146*a-b* of the links 110*a-b*, in other examples any suitable kinematic parameter of the robotic manipulator 103 may be calibrated. For example, other kinematic parameters that can be calibrated using techniques described herein can include any other dimensions or parameters of any component of the robotic manipulator 103. In an example, the kinematic parameters 148 can be DH parameters that can define the orientation of the $i_{th}$ link with respect to the $i-1_{th}$ link. In particular, the forward kinematics of a robotic manipulator can be expressed through homogeneous transformation matrices. For each link i, the transformation matrix $T_i$ can be:

$$T_i = \begin{bmatrix} \cos(\theta_i) & -\sin(\theta_i)\cos(\alpha_i) & \sin(\theta_i)\sin(\alpha_i) & a_i\cos(\theta_i) \\ 0 & \cos(\theta_i)\cos(\alpha_i) & -\cos(\alpha_i)\sin(\alpha_i) & a_i\sin(\theta_i) \\ 0 & \sin(\alpha_i) & \cos(\alpha_i) & d_i \\ 0 & 0 & 0 & 1 \end{bmatrix}$$

where the four quantities $\theta_i$, $a_i$, $d_i$, and $\alpha_i$ are kinematic parameters associated with link i and joint i. In particular, $a_i$ can be link length, $\alpha_i$ can be link twist, $d_i$ can be link offset, and $\theta_i$ can be joint angle. The complete transformation from base of robotic manipulator to end effector can be represented with $T=T_1*T_2* \ldots *T_n$. To determine kinematic parameters, the error between measured end-effector poses and calculated poses can be minimized, such as with an error function E defined as: $E=\Sigma\|T_m-T_c\|$, where $T_m$ represents measured transformation matrices and $T_c$ represents calculated transformation matrices. An optimization function can be used to minimize T:

$$\min_{\text{subject to: } \phi_{min} \le \phi \le \phi_{max}} E(\phi)$$

where $\phi$ represents the DH parameters [a, $\alpha$, d, $\theta$] for all joints. The final calibrated parameters should satisfy $\|T_m-T_c(\phi_{opt})\|\le\varepsilon$, where $\varepsilon$ is an accuracy threshold and $\phi_{opt}$ represents optimized DH parameters.

Further, although the robotic manipulator 103 is depicted in FIG. 1 as moving with respect to a two-dimensional (2D) plane, embodiments described herein can similarly and equivalently apply to movement of a robotic manipulator in any direction (e.g., in all three dimensions). And, while the end effector 114 is depicted and described in FIG. 1 as contacting the calibration guide 120, in other examples any component (e.g., joints 112*a-b*, links 110*a-b*, etc.) can be used to contact the calibration guide 120 at the known location 118 for determining actual kinematic parameters 148.

Figure 2:
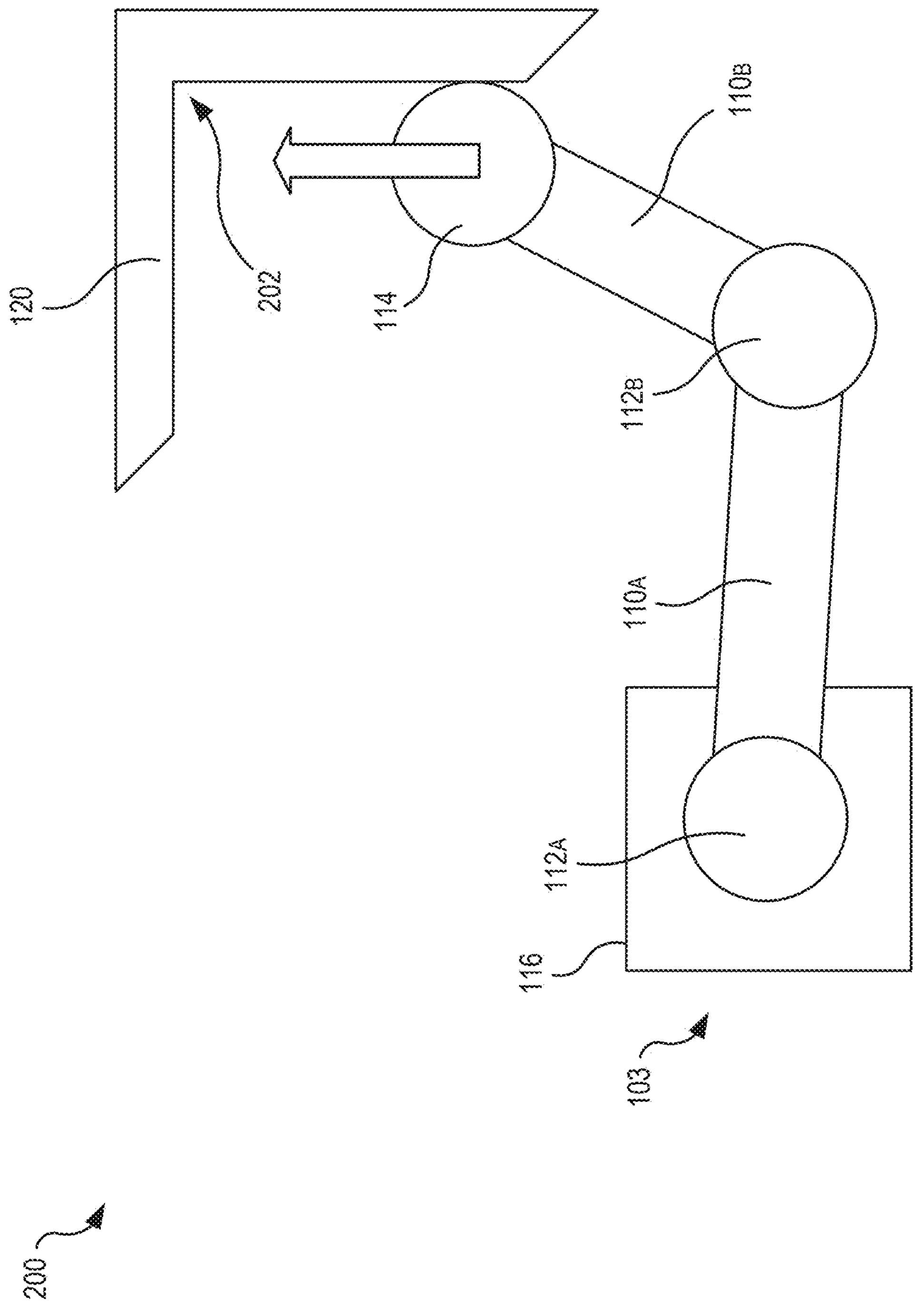
FIG. 2 illustrates an example diagram of a robotic manipulator contacting a calibration guide at a first time, according to some embodiments.

FIG. 2 illustrates an example diagram of a robotic manipulator 103 contacting a calibration guide 120 at a first time 200, according to some embodiments. The robotic manipulator 103 depicted in FIG. 2 may have a first link 110*a*, a second link 110*b*, a first joint 112*a*, a second joint 112*b*, and an end effector 114 that extend from a robotic base 116. Thus, the robotic manipulator 103 may have two degrees of freedom. The robotic manipulator 103 may be operating with compliance control (e.g., in a low-impedance mode) while executing a trajectory. Thus, when the end effector 114 contacts the surface of the calibration guide 120 at the first time 200, the end effector 114 can be prevented from attempting to move through the calibration guide 120.

Instead, movement of the robotic manipulator 103 can be modified to move the end effector 114 to follow along the surface of the calibration guide 120. For example, the surface of the calibration guide 120 can guide the end effector 114 to move in an upwards direction, as indicated by the arrow depicted in FIG. 2. The shape of the calibration guide 120 can guide the end effector 114 towards an interior corner 202 of the calibration guide 120. The interior corner 202 can be a location of the calibration guide 120 that constrains movement of the end effector 114, as depicted at a second time 300 in FIG. 3.

Figure 3:
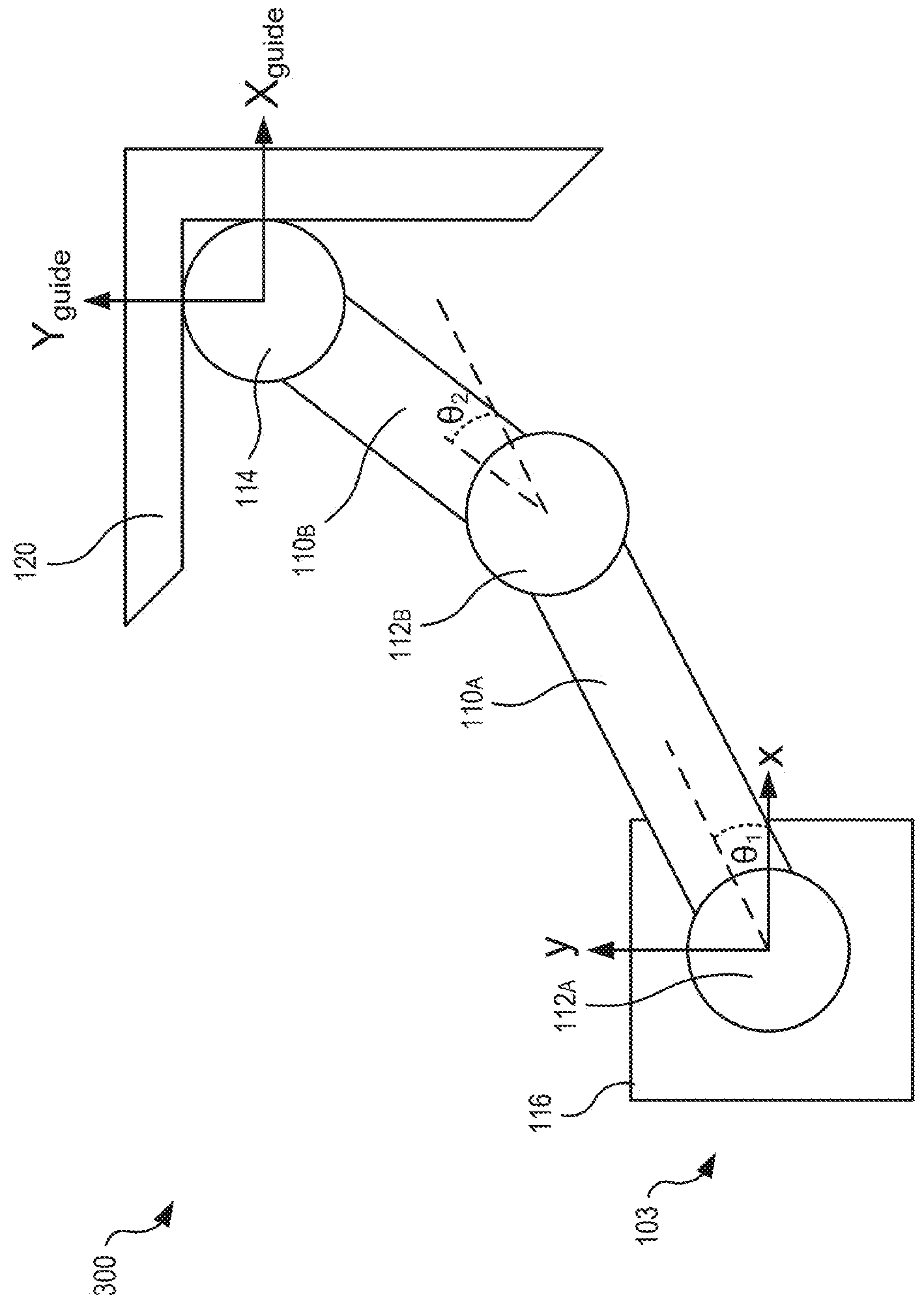
FIG. 3 illustrates an example diagram of the robotic manipulator of FIG. 2 contacting a known location of the calibration guide at a second time, according to some embodiments.

FIG. 3 illustrates an example diagram of the robotic manipulator 103 of FIG. 2 contacting a known location (e.g., the interior corner 202) of the calibration guide 120 at a second time 300, according to some embodiments. At the second time 300, the robotic manipulator 103 may have been guided (e.g., via compliance control by operating the robotic manipulator 103 in a low-impedance mode) to move the end effector 114 into the interior corner 202. The interior corner 202 can be a geometrically constrained location that can effectively halt movement of the end effector 114 by constraining the end effector 114 in at least two dimensions (e.g., the two arms of the calibration guide 120). The precise position of the end effector 114 when constrained by the interior corner 202 may be known and repeatable, thus serving as a reliable reference point for subsequent operations. That is, no matter the pose of the robotic manipulator 103 or direction of approach, the end effector 114 can be constrained to reach the exact known location at the interior corner 202.

For example, the robotic base 116 may have the location (x, y). The interior corner 202 of the calibration guide 120 (or, in some examples, the position of the end effector 114 at the interior corner 202) may have the known location of ($x_{guide}$, $y_{guide}$) with respect to the robotic base 116. After reaching the interior corner 202, joint angles for the joints 112*a-b* can be detected. As depicted in FIG. 3, first joint angle $\theta_1$ can be detected for the first joint 112*a* between the x-axis and the orientation of the first link 110*a*. second joint angle $\theta_2$ can be detected for the second joint 112*b* between the first joint angle $\theta_1$ and the orientation of the second link 110*b*. Use of the first joint angle $\theta_1$, the second joint angle $\theta_2$, and the known location ($x_{guide}$, $y_{guide}$) to determine actual first length $L_1$ of the first link 110*a* and actual second length $L_2$ of the second link 110*b* is described in further detail below with respect to FIG. 4.

Figure 4:
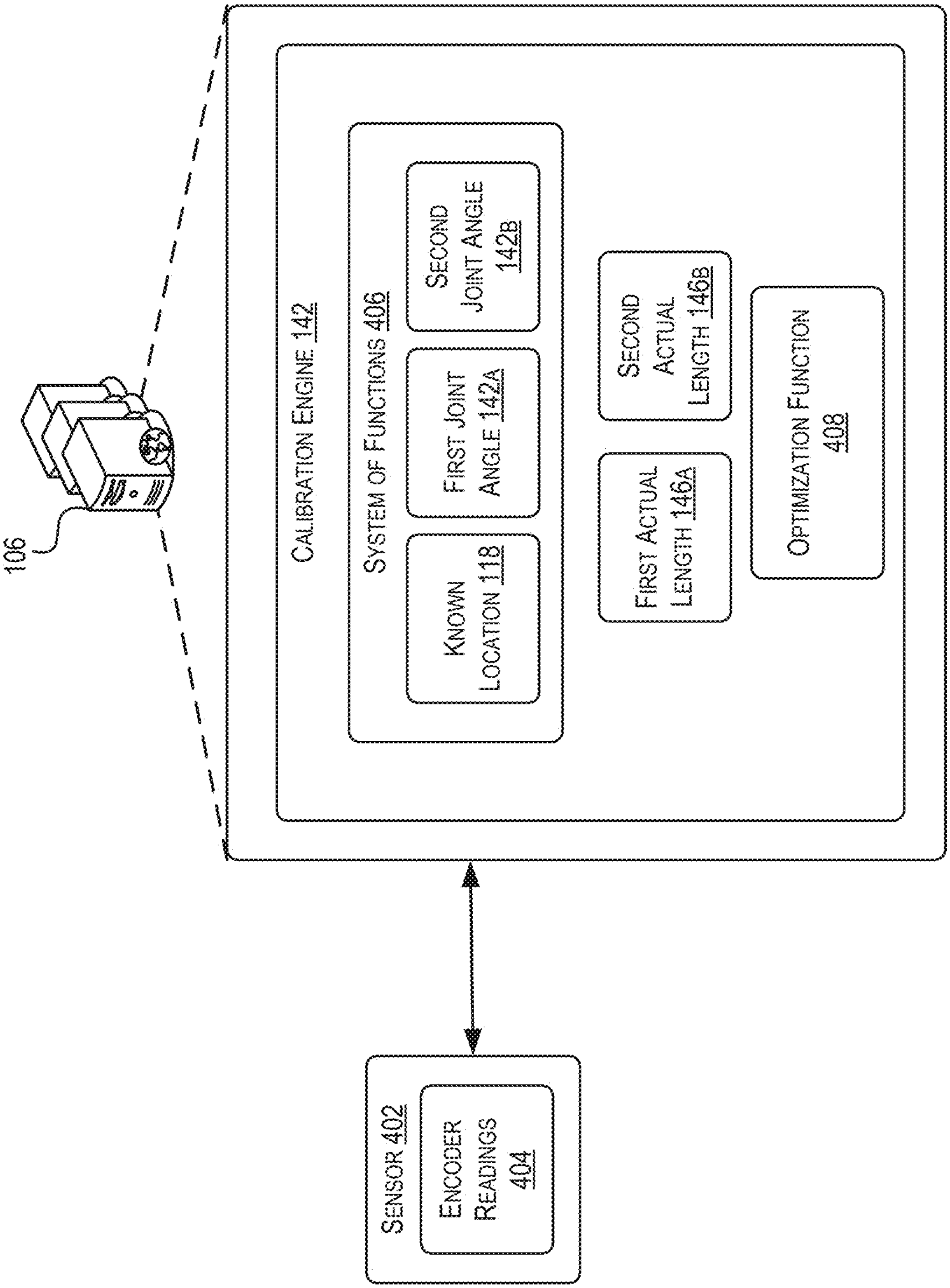
FIG. 4 illustrates a block diagram of an example computing system for performing robot kinematics calibration using compliance control, according to some embodiments.

FIG. 4 illustrates a block diagram of an example computing system 106 for performing robot kinematics calibration using compliance control, according to some embodiments. The computing system 106 can receive encoder readings 404 from sensors 402 coupled to the first joint 112*a* and the second joint 112*b* (e.g., of FIGS. 2-3). The encoder readings 404 can be digital values indicating orientation of the joints 112*a-b*. The computing system 106 can execute a calibration engine 142 to convert the encoder readings 404 into the first joint angle 142*a* (e.g., $\theta_1$) and the second joint angle 142*b* (e.g., $\theta_2$). The calibration engine 142 can generate a system of functions 406 using the known values of the joint angles 142*a-b* and the known location 118 of the interior corner 202 (e.g., ($x_{guide}$, $y_{guide}$)). An example system of functions 406 for the robotic manipulator 103, which has two degrees of freedom, can include:

$$x_{guide} = L_1 * \cos(\theta_1) + L_2\cos(\theta_1 + \theta_2)$$

$$y_{guide} = L_1 * \sin(\theta_1) + L_2\sin(\theta_1 + \theta_2)$$

Using the known quantities, calibration engine 142 can solve the system of functions 406 to determine values for first actual length 146*a* (e.g., $L_1$) of the first link 110*a* and second actual length 146*b* (e.g., $L_2$).

In some examples, the system of functions 406 may include additional functions. For example, the robotic manipulator 103 may be controlled to position the end effector 114 at the interior corner 202 in multiple different pose orientations (e.g., joint angles and link orientations). The joint angles for each pose orientation can be reflected in additional functions in the system of functions 406 to provide additional data points that can increase accuracy in determining actual link lengths. Any number of pose orientations (and resulting joint angles) can be used to generate functions for the system of functions 406. In some examples with relatively large numbers of functions in the system of functions 406, the calibration engine 142 may utilize an optimization function 408 to solve the system of functions 406. For example, a least means square function can be used to find values for the actual lengths 146*a-b* that minimize the sum of squared differences in the system of functions 406. Any other suitable optimization function may be used to determine values for the actual lengths 146*a-b*.

Figure 5:
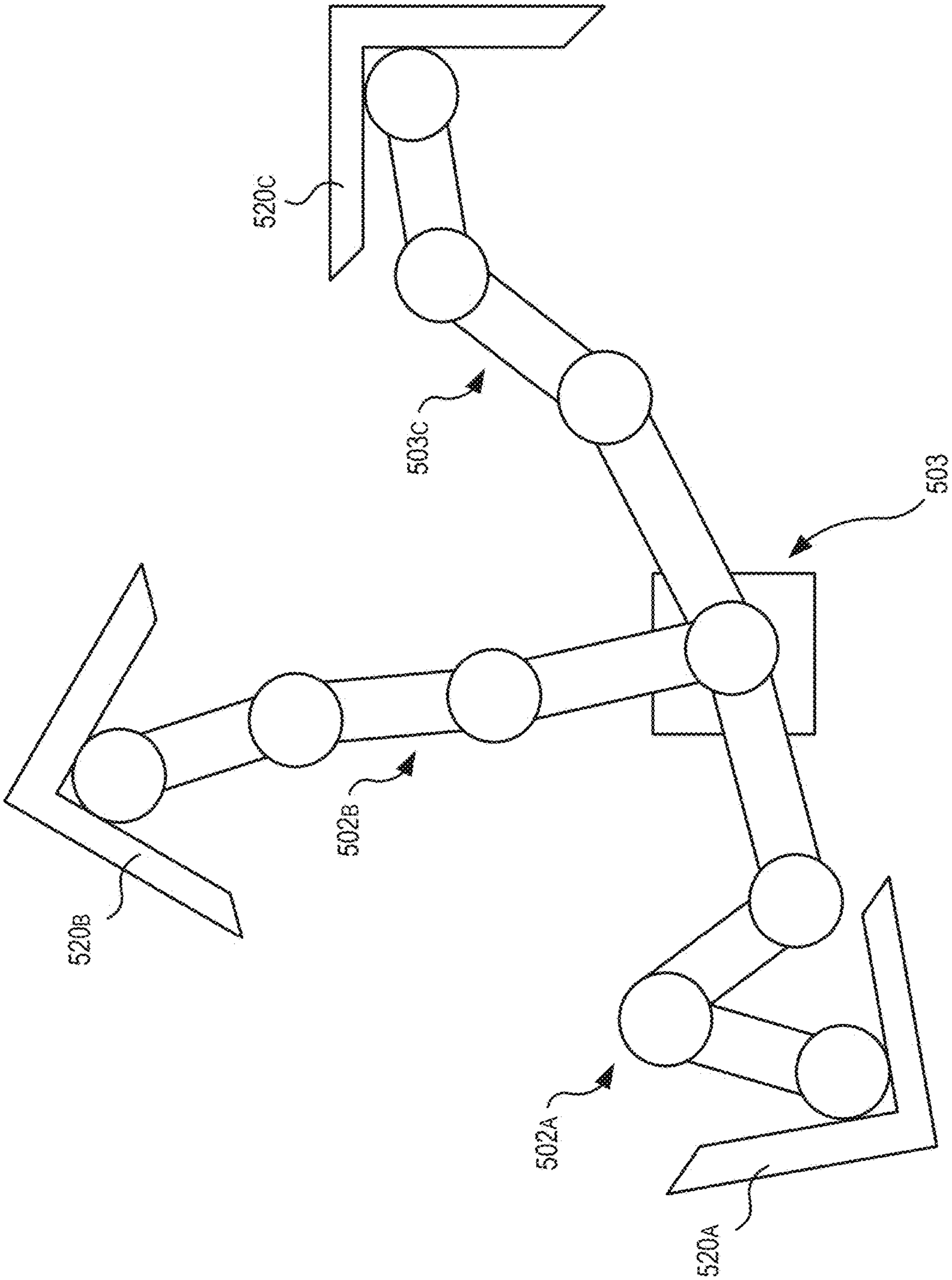
FIG. 5 illustrates an example diagram of a robotic manipulator contacting multiple calibration guides for performing robot kinematics calibration, according to some embodiments.

In some examples, the techniques described herein may similarly be applied to robotic manipulators with any number of degrees of freedom. Such an example is depicted in FIG. 5, which illustrates an example diagram of a robotic manipulator 503 contacting multiple calibration guides 520*a-c* for performing robot kinematics calibration, according to some embodiments. The robotic manipulator 503 may be guided (e.g., via compliance control in a low-impedance mode) to a first known location of a first calibration guide 520*a* using a first pose orientation 502*a*, then to a second known location of a second calibration guide 520*b* using a second pose orientation 502*b*, then to a third known location of a third calibration guide 520*c* using a third pose orientation 502*c*. The joint angles at the different pose orientations 502*a-c* can be incorporated into additional functions in the system of functions 406.

In some examples, at the known location of each calibration guide 520*a-c*, multiple pose orientations of the robotic manipulator 503 can be detected and incorporated into the system of functions 406. For example, an end effector of the robotic manipulator 503 can be moved to a known location of one of the calibration guides 520*a-c*, such as first calibration guide 520*a*. Then, the joints of the robotic manipulator may be actuated to change the pose orientation, while keeping the end effector at the known location. The joint angles at the different pose orientations for a single calibration guide can be incorporated into additional functions in the system of functions 406. In such examples, it may be beneficial to use optimization function techniques to determine actual link length values.

Figure 6:
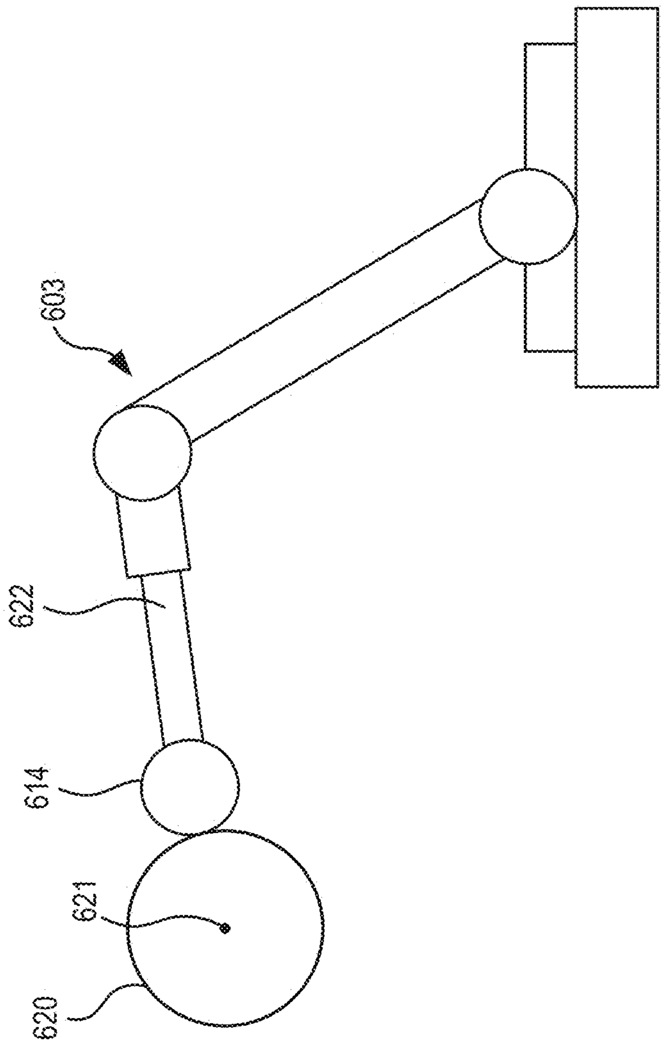
FIG. 6 illustrates an example diagram of a robotic manipulator contacting a spherical calibration guide, according to some embodiments.

Although the calibration guides of FIGS. 1-3 and 5 are depicted as having a right angle shape forming an interior corner to be used as a constrained known location, in other examples any suitable shape or type of calibration guide may also be used. The calibration guides of FIGS. 1-3 and 5 can be examples of concave calibration guides, which may constrain the end effector of the robotic manipulator (or any other component of the robotic manipulator) in the known location. In other examples, a convex calibration guide may be used. For example, FIG. 6 illustrates an example diagram of a robotic manipulator 603 contacting a spherical calibration guide 620, according to some embodiments. The surface of the spherical calibration guide 620 can be a known location, and the dimensions of the spherical calibration guide 620 may also be known. The robotic manipulator 603 can have an end effector 614 that can be moved along the surface of the spherical calibration guide (e.g., from a first point on the surface to a second point on the surface). Due to its spherical shape, contact with any point on the surface of the spherical calibration guide 620 may be at a same distance from a central point 621 of the spherical calibration guide 620. Thus, joint angles for the robotic manipulator 603 can be determined when the end effector 614 is positioned at the first point and at the second point and then used in determining actual kinematic parameters of the robotic manipulator 603. Further, in some examples, the robotic manipulator 603 (or any other robotic manipulator described or depicted herein) may have any combination of revolute joints, prismatic (e.g., linear) joints, or any other suitable types of joints. As depicted in FIG. 6, the robotic manipulator 603 may include a prismatic joint 622.

Figure 7:
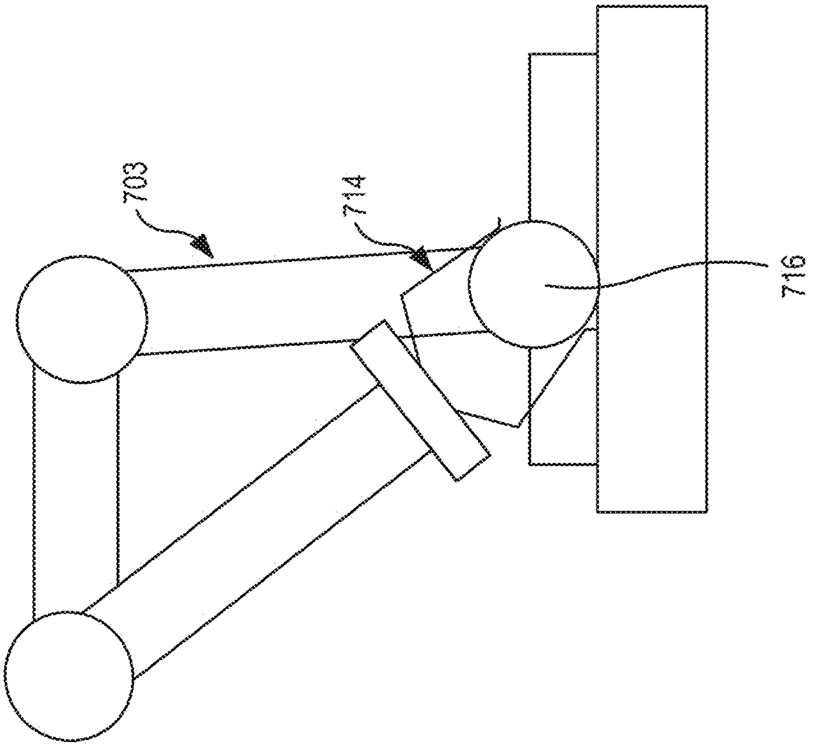
FIG. 7 illustrates an example diagram of a robotic manipulator contacting a known location of a calibration guide at a robotic base of the robotic manipulator, according to some embodiments.

In some examples, the calibration guide may be incorporated to the structure of the robotic manipulator. Or, existing components of the robotic manipulator can be used as a calibration guide. Such an example is depicted in FIG. 7, which illustrates an example diagram of a robotic manipulator 703 contacting a known location of a calibration guide at a robotic base 116 of the robotic manipulator 703, according to some embodiments. For example, the calibration guide may be a joint at the robotic base 716. The end effector 714 of the robotic manipulator 703 is depicted as a gripper, but in other examples, any other suitable end effector may be used. In the example depicted in FIG. 7, the coordinates of the robotic base 716 may be the same as the coordinates of the calibration guide.

The end effector 714 of the robotic manipulator 703 may be guided (e.g., via compliance control using a low-impedance mode) towards the joint at the robotic base 716. The position of the end effector 714 may be constrained (e.g., prevented from further movement) when the end effector 714 grasps the robotic base 716 (e.g., the calibration guide). By using components of the robotic manipulator 703 as the calibration guide, calibration of the robotic manipulator 703 may be performed without the use of any additional equipment. Thus, calibration of the robotic manipulator 703 can be performed at any location.

FIG. 8 illustrates a flowchart showing an example process 800 for performing robot kinematics calibration using compliance control, according to some embodiments. In some examples, the computing system 106 of FIG. 1 or 4 and/or the computer system 1002 of FIG. 10 may perform some or all parts of the process 800.

The process 800 may begin at block 802, which can involve a robotic manipulator being positioned in a starting pose (e.g., an initial pose orientation of joint angles and link orientations at an initial location). The initial location of the starting pose may be at a distance from a calibration guide. The location of the calibration guide may be a known location with respect to the robotic manipulator. Movement of the robotic manipulator may be controlled by a robotic controller (e.g., executed by a computing system).

At block 804, the robotic controller can active an impedance mode for the robotic manipulator. The impedance mode can allow the robotic manipulator to interact safely with its environment by enabling the robotic manipulator to contact hard surfaces without risking damage to the robotic manipulator or to surroundings. The impedance mode may be similar to the manner in which a person may walk through a dark room with arms outstretched, ready to yield upon contact with obstacles to minimize risk of injury from unexpected collisions. For example, when contact occurs between the robotic manipulator and environmental obstacles, instead of rigidly maintaining a programed path, the robotic manipulator may adjust its direction to move along the obstacle rather than attempting to push through the obstacle.

At block 806, the robotic controller can control the robotic manipulator along a pre-planned task-space trajectory. The trajectory can be a pathway for moving the robotic manipulator from the starting pose to a known location of a calibration guide. The pre-planned trajectory can be an estimated trajectory that is based on estimated (e.g., nominal) parameters for the robotic manipulator. The estimated parameters can be intended robotic dimensions. But manufacturing tolerances may result in differences between the intended robotic dimensions and actual robotic dimensions. Thus, the trajectory may be somewhat inaccurate in moving the robotic manipulator to the exact known location of the calibration guide.

Because the robotic controller is moving the robotic manipulator along the trajectory in the impedance mode, when the robotic manipulator contacts a surface of the calibration guide, the pre-planned trajectory can be adjusted to move the end effector along the surface. The end effector can follow along the surface of the calibration guide until reaching the known location.

At block 808, the robotic controller can determine if motion of the end effector of the robotic manipulator has stopped. If motion of the end effector has stopped, the process 800 can continue to block 810. If motion of the end effector has not stopped, the process 800 can return to block 806. The robotic controller can determine that motion has stopped if the end effector of the robotic manipulator has been constrained due to the impedance mode. For example, if the end effector is positioned within an interior corner of a calibration guide that has a right-angle shape, the impedance mode may prevent the end effector from moving out of the interior corner. Thus, motion may be stopped and the robotic manipulator may be in a final pose.

At block 810, the computing system can execute a calibration routine to determine actual kinematic parameters for the robotic manipulator. For example, the computing system can detect joint angles of the robotic manipulator at the final pose. Such joint angles, in combination with the known location of the end effector constrained by the calibration guide, can be used to identify the actual dimensions of the components of the robotic manipulator (e.g., the actual kinematic parameters).

Reaching the exact known location of the calibration guide consistently would likely be impossible if operating the robotic manipulator in a high impedance (e.g., position-controlled) mode. Techniques described herein can enable the end effector to repeatedly and accurately be positioned at the known location of the end effector by using the low impedance mode FIG. 9 illustrates a flowchart showing another example process 900 for performing robot kinematics calibration using compliance control, according to some embodiments. In some examples, the computing system 106 of FIG. 1 or and/or the computer system 1002 of FIG. 10 may perform some or all parts of the process 900.

The process 900 may begin at block 902, in which the computing system can control, based at least in part on estimated kinematic parameters of a robotic manipulator that comprises at least one joint, the robotic manipulator along a trajectory towards a guide with a known location with respect to the robotic manipulator. In some examples, the known location of the guide may be an interior corner of the guide. In other examples, the known location of the guide may be an object. The robotic manipulator may be controlled along the trajectory to grasp the object with the end effector. In some examples, the known location of the guide can be a robotic base of the robotic manipulator.

At block 904, the computing system can adjust movement of the robotic manipulator along the trajectory based at least in part on sensor data associated with the at least one joint. For example, the sensor data can be a torque measurement or a force measurement that can be received from a torque sensor or a force sensor of the at least one joint. The computing system can determine, based at least in part on the torque measurement or the force measurement, that the robotic manipulator has contacted a surface of the guide. The computing system can reduce a force applied by the robotic manipulator to the guide based at least in part on determining that the robotic manipulator has contacted the surface of the guide. In some examples, adjusting movement of the robotic manipulator along the trajectory can involve modifying the trajectory to move the robotic manipulator along the surface of the guide towards the known location.

At block 906, the computing system can determine that a component of the robotic manipulator is positioned at the known location of the guide. The component may be, for example, the end effector, a link, a joint, or any other suitable component of the robotic manipulator. The at least one joint may have a joint angle when the component is positioned at the known location. For example, the computing system can determine, based at least in part on the torque measurement, that the guide is preventing further movement of the robotic manipulator. In some examples, the joint angle may be a first joint angle that is detected at a first pose of the robotic manipulator at the known location. The computing system may control the robotic manipulator to position the end effector at the known location of the guide using a second pose. The computing system may detect a second joint angle of the at least one joint when the end effector is positioned at the known location using the second pose.

In some examples, the calibration guide may be a first guide and the trajectory may be a first trajectory. The computing system may control, based at least in part on the estimated kinematic parameters, the robotic manipulator along a second trajectory towards a second guide with a second known location with respect to the robotic manipulator, the computing system can determine that the end effector is positioned at the second known location of the second guide and can determine a second joint angle of the at least one joint when the end effector is positioned at the second known location. In such examples, the robotic manipulator may have at least two degrees of freedom.

At block 908, the computing system can determine actual kinematic parameters of the robotic manipulator based at least in part on the known location and the joint angle. In some examples, the actual kinematic parameters can include at least an actual length of one or more links of the robotic manipulator. If the robotic manipulator is positioned at the known location using multiple poses, the actual kinematic parameters may be determined based at least in part on the first joint angle and the second joint angle. Additionally or alternatively, if the robotic manipulator is positioned at multiple known locations (e.g., of multiple guides), the actual kinematic parameters may be determined based at least in part on the first joint angle and the second joint angle for poses at the multiple guides.

In some examples, the actual kinematic parameters may be determined by generating a system of functions based at least in part on the first known location, the first joint angle, the second known location, and the second joint angle. The computing system may determine the first actual length and the second actual length by at least solving the system of functions. In some examples, the computing system can determine the actual kinematic parameters by at least applying an optimization function to the system of functions.

After determining the actual kinematic parameters, the computing system may calibrate a controller for the robotic manipulator based at least in part on the actual kinematic parameters. The calibrated controller can then control movement of the robotic manipulator by using the actual kinematic parameters instead of estimated kinematic parameters (e.g., estimated link lengths).

Figure 10:
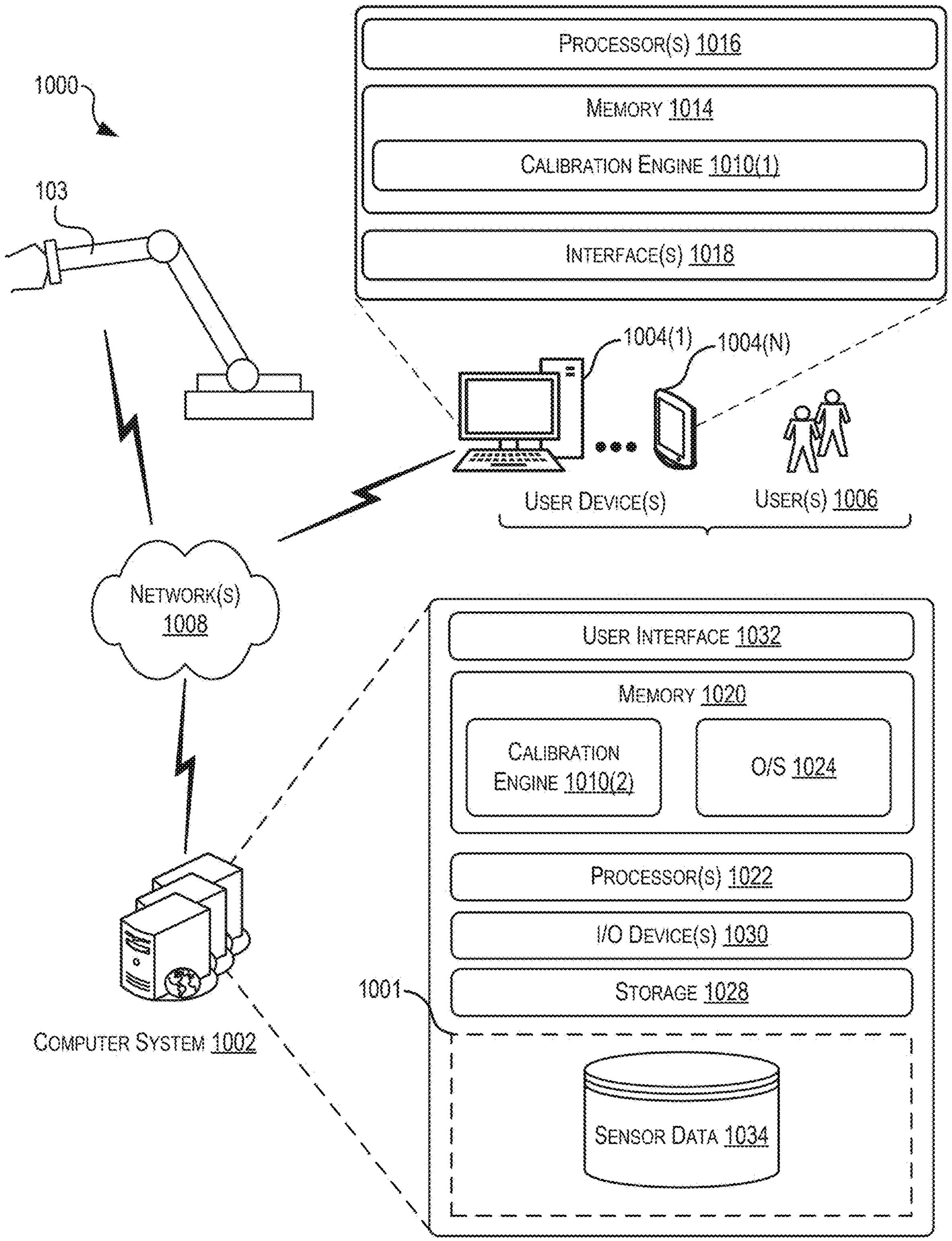
FIG. 10 illustrates an environment in which various embodiments can be implemented.

FIG. 10 illustrates an example schematic architecture 1000 for implementing techniques related to swing anomaly detection for robotic manipulation of objects, according to embodiments of the present disclosure. The architecture 1000 may include a computer system 1002 (e.g., the computing system 106 described herein) in communication with one or more user devices 1004(1)-1004(N) via one or more networks 1008 (hereinafter, "the network 1008").

The architecture 1000 may additionally include a robotic manipulator 103 in communication with the computer system 1002 and/or the user devices 1004. For example, the robotic manipulator 103 may include sensors that can transmit sensor data to the computer system 1002 and/or the user devices 1004. The computer system 1002 and/or the user devices 1004 may also control movement of the robotic manipulator 103, such as by executing a robotic controller.

The user device 1004 may be operable by one or more users 1006 to interact with the computer system 1002. The user device 1004 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 1004(1) is illustrated as a desktop computer, while the user device 1004(N) is illustrated as an example of a handheld mobile device.

The user device 1004 may include a memory 1014 and processor(s) 1016. In the memory 1014 may be stored program instructions that are loadable and executable on the processor(s) 1016, as well as data generated during the execution of these programs. Depending on the configuration and type of user device 1004, the memory 1014 may be volatile (such as random access memory ("RAM")) and/or non-volatile (such as read-only memory (ROM), flash memory, etc.).

In some examples, the memory 1014 may include a version of a calibration engine 1010 (e.g., 1010(1)). The calibration engine 1010(1) may allow the user 1006 to interact with the computer system 1002 via the network 1008. The user device 1004 may also include one or more interfaces 1018 to enable communication with other devices, systems, and the like. The calibration engine 1010(1), whether embodied in the user device 1004 or the computer system 1002, may be configured to perform the techniques described herein. For example, the calibration engine 1010 can determine actual kinematic parameters of components of the robotic manipulator 103. In an example, the calibration engine 1010 can include any other suitable devices, engines, modules, models, and the like.

Turning now to the details of the computer system 1002, the computer system 1002 may include one or more computer system computers, perhaps arranged in a cluster of servers or as a server farm, and may host web service applications. The function of the computer system 1002 may be implemented a cloud-based environment such that individual components of the computer system 1002 are virtual resources in a distributed environment.

The computer system 1002 may include at least one memory 1020 and one or more processing units (or processor(s)) 1022. The processor 1022 may be implemented as appropriate in hardware, computer-executable instructions, software, firmware, or combinations thereof. Computer-executable instruction, software, or firmware implementations of the processor 1022 may include computer-executable or machine-executable instructions written in any suitable programming language to perform the various functions described. The memory 1020 may include more than one memory and may be distributed throughout the computer system 1002. The memory 1020 may store program instructions that are loadable and executable on the processor(s) 1022, as well as data generated during the execution of these programs. Depending on the configuration and type of memory including the computer system 1002, the memory 1020 may be volatile (such as RAM and/or non-volatile (such as read-only memory ("ROM"), flash memory, or other memory)). The memory 1020 may include an operating system 1024 and one or more application programs, modules, or services for implementing the features disclosed herein including at least a version of the calibration engine 1010 (e.g., 1010(2)). For example, the calibration engine 1010(2) may perform the functionality described herein.

The computer system 1002 may also include additional storage 1028, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1028, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1002 and/or part of the computing system 106.

The computer system 1002 may also include input/output (I/O) device(s) and/or ports 1030, such as for enabling connection with a keyboard, a mouse, a pen, a voice input device, a touch input device, a display, speakers, a printer, or other I/O device.

In some examples, the computer system 1002 may also include one or more user interface(s) 1032. The user interface 1032 may be utilized by an operator, curator, or other authorized user to access portions of the computer system 1002. In some examples, the user interface 1032 may include a graphical user interface, voice interfaces, web-based applications, programmatic interfaces such as APIs, or other user interface configurations.

The computer system 1002 may also include a data store 1001. In some examples, the data store 1001 may include one or more databases, data structures, or the like for storing and/or retaining information associated with the computer system 1002. The calibration engine 1010 is communicatively coupled (e.g., via a wired connection or a wireless connection) to the data store 1001. The data store 1001 includes sensor data storage 1034. In an example, the data store 1001 can include any other suitable data, databases, libraries, and the like. The sensor data storage 1034 can include torque data and/or joint angle data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
- a robotic manipulator comprising:
  - a first link rotatably coupled to a robotic base via a first joint, the first link having a first estimated length, the first joint comprising a first torque sensor configured to detect torque measurements with respect to the robotic manipulator;
  - a second link having a second estimated length;
  - a second joint rotatably coupling the first link to the second link, the second joint comprising a second torque sensor configured to detect torque measurements with respect to the robotic manipulator; and
  - an end effector coupled to the second link;
- a calibration guide having a known location with respect to the robotic base, wherein the known location is constrained in at least two dimensions; and
- a computer system configured to at least:
  - control the robotic manipulator to move the end effector to the known location of the calibration guide by at least:
    - controlling, based at least in part on the first estimated length and the second estimated length, the robotic manipulator to move along a trajectory towards the known location;
    - receiving, from the first torque sensor or the second torque sensor while the robotic manipulator is moving along the trajectory, torque data for the robotic manipulator; and
    - adjusting the trajectory based at least in part on the torque data; and
  - responsive to determining that the end effector is at the known location, determine a first joint angle of the first joint and a second joint angle of the second joint; and
  - determine a first actual length of the first link and a second actual length of the second link based at least in part on the known location, the first joint angle, and the second joint angle.

2. The system of claim 1, wherein the computer system is further configured to determine the first actual length and the second actual length by at least:
- generating a system of functions for the first actual length and the second actual length based at least in part on the first joint angle, the second joint angle, an orientation of the robotic manipulator, and the known location, wherein the known location comprises location coordinates with respect to the robotic base; and
- solving the system of functions for the first actual length and the second actual length.

3. The system of claim 1, wherein the computer system is further configured to adjust the trajectory based at least in part on the torque data by at least:
- determining, based at least in part on the torque data, that the end effector has contacted a surface of the calibration guide; and
- modifying the trajectory to move the robotic manipulator along the surface of the calibration guide towards the known location based at least in part on the torque data.

4. The system of claim 1, wherein the computer system is further configured to determine the first joint angle and the second joint angle based at least in part on first sensor data received from a first joint sensor in the first joint and second sensor data from a second joint sensor in the second joint.

5. A computer-implemented method, comprising:
- controlling, based at least in part on estimated kinematic parameters of a robotic manipulator that comprises at least one joint, the robotic manipulator along a trajectory toward a guide with a known location with respect to the robotic manipulator;
- adjusting movement of the robotic manipulator along the trajectory based at least in part on sensor data associated with the at least one joint;
- determining that a component of the robotic manipulator is positioned at the known location of the guide, wherein the at least one joint has a joint angle when the component is positioned at the known location; and
- determining actual kinematic parameters of the robotic manipulator based at least in part on the known location and on the joint angle.

6. The computer-implemented method of claim 5, wherein the sensor data comprises a torque measurement, and wherein adjusting movement of the robotic manipulator along the trajectory based at least in part on the torque measurement further comprises:
- receiving the torque measurement from a torque sensor of the at least one joint;
- determining, based at least in part on the torque measurement, that the robotic manipulator has contacted a surface of the guide; and
- reducing a force applied by the robotic manipulator to the guide based at least in part on determining that the robotic manipulator has contacted the surface of the guide.

7. The computer-implemented method of claim 6, wherein adjusting movement of the robotic manipulator along the trajectory further comprises:
- modifying the trajectory to move the robotic manipulator along the surface of the guide towards the known location.

8. The computer-implemented method of claim 5, wherein determining that the component is positioned at the known location of the guide further comprises:

determining, based at least in part on the sensor data, that the guide is preventing further movement of the robotic manipulator.

9. The computer-implemented method of claim 5, wherein the joint angle is a first joint angle detected at a first pose of the robotic manipulator at the known location, and wherein the computer-implemented method further comprises:

controlling the robotic manipulator to position the component at the known location of the guide using a second pose, wherein the second pose is different than the first pose;

detecting a second joint angle of the at least one joint when the component is positioned at the known location using the second pose; and determining the actual kinematic parameters of the robotic manipulator based at least in part on the first joint angle and the second joint angle.

10. The computer-implemented method of claim 5, wherein the joint angle is a first joint angle detected at a first known location of a first guide, wherein the trajectory is a first trajectory, and wherein the computer-implemented method further comprises:

controlling, based at least in part on the estimated kinematic parameters, the robotic manipulator along a second trajectory towards a second guide with a second known location with respect to the robotic manipulator;

determining that the component is positioned at the second known location of the second guide; and determining the actual kinematic parameters based at least in part on the second known location and a second joint angle of the at least one joint when the component is positioned at the second known location.

11. The computer-implemented method of claim 10, wherein determining the actual kinematic parameters based at least in part on the second known location and the second joint angle further comprises:

generating a system of functions based at least in part on the first known location, the first joint angle, the second known location, and the second joint angle; and determining, by at least applying an optimization function to the system of functions, the actual kinematic parameters.

12. The computer-implemented method of claim 10, wherein the robotic manipulator has at least two degrees of freedom.

13. The computer-implemented method of claim 5, wherein the known location of the guide comprises an interior corner of the guide.

14. The computer-implemented method of claim 5, wherein the component is an end effector, wherein the guide comprises a spherical object, wherein the known location of the guide comprises a surface of the spherical object, and wherein the computer-implemented method further comprises:

controlling the end effector to move from a first point at the surface of the spherical object to a second point at the surface of the spherical object; and determining the actual kinematic parameters based at least in part on the at least one joint angle when the end effector is positioned at the first point and the second point.

15. The computer-implemented method of claim 5, wherein the known location of the guide comprises a robotic base of the robotic manipulator.

16. The computer-implemented method of claim 5, wherein the actual kinematic parameters comprise at least an actual length of one or more links of the robotic manipulator.

17. One or more non-transitory computer-readable media comprising computer-executable instructions that, when executed by one or more processing devices, cause the one or more processing devices to perform operations comprising:

controlling, based at least in part on estimated kinematic parameters of a robotic manipulator that comprises at least one joint, the robotic manipulator along a trajectory toward a guide with a known location with respect to the robotic manipulator;

adjusting movement of the robotic manipulator along the trajectory based at least in part on sensor data associated with the at least one joint;

determining that a component of the robotic manipulator is positioned at the known location of the guide, wherein the at least one joint has a joint angle when an end effector is positioned at the known location; and determining actual kinematic parameters of the robotic manipulator based at least in part on the known location and on the joint angle.

18. The one or more non-transitory computer-readable media of claim 17, wherein the actual kinematic parameters comprise at least a first actual length of a first link and a second actual length of a second link in the robotic manipulator, and wherein determining the actual kinematic parameters further comprises:

generating a system of functions based at least in part on the known location and the joint angle; and determining the first actual length and the second actual length by at least solving the system of functions.

19. The one or more non-transitory computer-readable media of claim 17, wherein the operations further comprise:

calibrating a controller for the robotic manipulator based at least in part on the actual kinematic parameters; and controlling, by the calibrated controller, movement of the robotic manipulator by using the actual kinematic parameters.

20. The one or more non-transitory computer-readable media of claim 17, wherein the sensor data comprises at least one of a torque measurement or a force measurement, and wherein adjusting movement of the robotic manipulator along the trajectory based at least in part on the torque measurement further comprises:

receiving the sensor data from at least one of a torque sensor or a force sensor of the at least one joint;

determining, based at least in part on the sensor data, that the robotic manipulator has contacted a surface of the guide;

reducing a force applied by the robotic manipulator to the guide based at least in part on determining that the robotic manipulator has contacted the surface of the guide; and modifying the trajectory to move the robotic manipulator along the surface of the guide towards the known location.

* * * * *